United States Patent
Chen et al.

(10) Patent No.: US 7,527,887 B2
(45) Date of Patent: *May 5, 2009

(54) STRUCTURES OF THE PROTON EXCHANGE MEMBRANES WITH DIFFERENT MOLECULAR PERMEABILITIES

(75) Inventors: Jong-Pyng Chen, Hsinchu (TW); Jen-Luan Chen, Taipei (TW); Chih-Jer Shih, Tainan (TW); Chih-Yuan Chen, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 888 days.

This patent is subject to a terminal disclaimer.

(21) Appl. No.: 10/864,546

(22) Filed: Jun. 10, 2004

(65) Prior Publication Data

US 2005/0181255 A1  Aug. 18, 2005

(30) Foreign Application Priority Data

Feb. 18, 2004 (TW) .............................. 93103839 A

(51) Int. Cl.
*H01M 8/10* (2006.01)
(52) U.S. Cl. .................... 429/33; 204/296; 429/30; 521/27
(58) Field of Classification Search .................. 429/33, 429/30; 204/296; 521/27
See application file for complete search history.

(56) References Cited

U.S. PATENT DOCUMENTS

| | | | |
|---|---|---|---|
| 4,037,024 A | 7/1977 | Landau | |
| 4,380,575 A | 4/1983 | Nakamura et al. | |
| 4,594,297 A | 6/1986 | Polak et al. | |
| 4,626,553 A | 12/1986 | Hane et al. | |
| 4,672,438 A | 6/1987 | Plante et al. | |
| 4,687,715 A | 8/1987 | Michael | |
| 4,769,297 A | 9/1988 | Reiser et al. | |
| 4,826,741 A | 5/1989 | Aldhart et al. | |
| 5,272,017 A | 12/1993 | Swathirajan et al. | |
| 5,316,871 A | 5/1994 | Swathirajan et al. | |
| 5,447,636 A | 9/1995 | Banerjee | |

(Continued)

FOREIGN PATENT DOCUMENTS

WO   WO 98/52243   11/1998

*Primary Examiner*—Peter D. Mulcahy
*Assistant Examiner*—Henry Hu
(74) *Attorney, Agent, or Firm*—Muncy, Geissler, Olds & Lowe, PLLC

(57) ABSTRACT

The invention relates to the structures of proton exchange membranes with different molecular permeabilities, especially to the proton exchange membranes suitable for the applications in Direct Methanol Fuel Cell (DMFC) and with the function of recovering water from the cathode. The polymeric structures are the designs of phase separated structures of the crystalline phase and the amorphous phases, thereby limiting the swelling of the materials and the space of ionic cluster structures in nano-scale to reduce the permeability of methanol fuels On the other hand, by controlling of polymeric grafting reactions result in the reverse (from the cathode to the anode) permeability of the product water molecules on the cathode in the proton exchange materials greater than the permeability of methanol molecules in the fuels (from the anode to the cathode) due to the differences of fuel concentrations between the cathode and the anode of DMFC. Hence, it has the function of recovering water of the cathode and does not have the over-permeable phenomena as seen in methanol molecule.

11 Claims, 9 Drawing Sheets

U.S. PATENT DOCUMENTS

| | | |
|---|---|---|
| 5,503,944 A | 4/1996 | Meyer et al. |
| 5,525,436 A | 6/1996 | Savinell et al. |
| 5,599,639 A | 2/1997 | Sansone et al. |
| 5,654,109 A | 8/1997 | Plowman et al. |
| 5,700,595 A | 12/1997 | Reiser |
| 5,716,727 A | 2/1998 | Savinell et al. |
| 5,795,496 A | 8/1998 | Yen et al. |
| 5,795,668 A | 8/1998 | Banerjee |
| 5,849,428 A | 12/1998 | Hamlen |
| 5,853,909 A | 12/1998 | Reiser |
| 5,919,583 A | 7/1999 | Grot et al. |
| 5,981,097 A | 11/1999 | Rajendran |
| 6,025,085 A | 2/2000 | Savinell et al. |
| 6,059,943 A | 5/2000 | Murphy et al. |
| 6,099,988 A | 8/2000 | Savinell et al. |
| 6,117,577 A | 9/2000 | Wilson |
| 6,124,060 A | 9/2000 | Akita et al. |
| 6,242,122 B1 | 6/2001 | Dohle et al. |
| 6,277,513 B1 | 8/2001 | Swathirajan et al. |
| 6,365,294 B1 | 4/2002 | Pintauro et al. |
| 6,387,230 B1 | 5/2002 | Murphy et al. |
| 6,432,568 B1 | 8/2002 | Salvador et al. |
| 6,444,343 B1 | 9/2002 | Prakash et al. |
| 6,447,943 B1 | 9/2002 | Peled et al. |
| 6,458,479 B1 | 10/2002 | Ren et al. |
| 6,492,052 B2 | 12/2002 | Ren |
| 6,509,112 B1 | 1/2003 | Luft et al. |
| 6,579,637 B1 | 6/2003 | Savage et al. |
| 6,586,128 B1 | 7/2003 | Johnson et al. |
| 6,596,422 B2 | 7/2003 | Ren |
| 6,824,900 B2 * | 11/2004 | DeFilippis .................... 429/13 |
| 6,827,986 B2 * | 12/2004 | Asukabe et al. ............. 427/536 |
| 7,128,993 B2 * | 10/2006 | Barnwell et al. .............. 429/30 |
| 2003/0166773 A1 * | 9/2003 | Chen et al. .................... 525/70 |

* cited by examiner

| Membrane (Fuel Con.) | Water Permeability (cm²/sec) | MeOH Permeability (cm²/sec) | H₂O Per./MeOH Per. | Fuel Loss(%) |
|---|---|---|---|---|
| Nafion 117 (50vol%) | $0.76*10^{-6}$ | $4.12*10^{-6}$ | 0.18 | 70.6% |
| Nafion 117 (100vol%) | $2.82*10^{-6}$ | $6.02*10^{-6}$ | 0.47 | 48.6% |
| PEM A (50vol%) | $1.29*10^{-6}$ | $0.80*10^{-6}$ | 1.61 | 21.6% |
| PEM A (100vol%) | $0.90*10^{-6}$ | $0.56*10^{-6}$ | 1.61 | 21.6% |

Fig.7

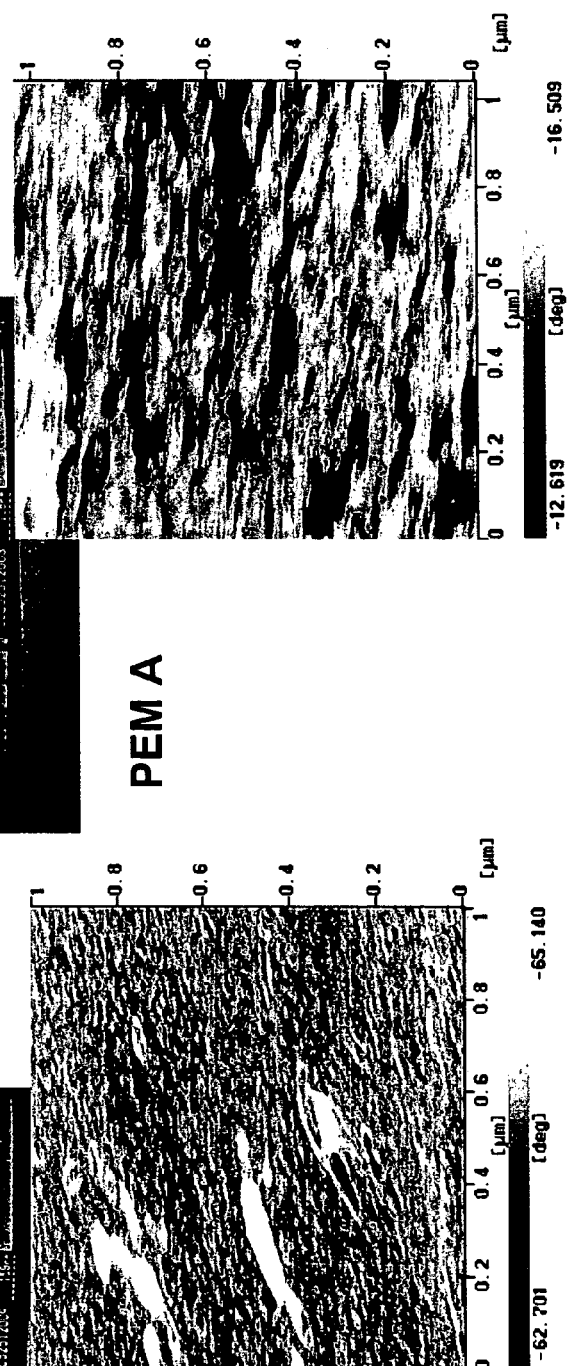
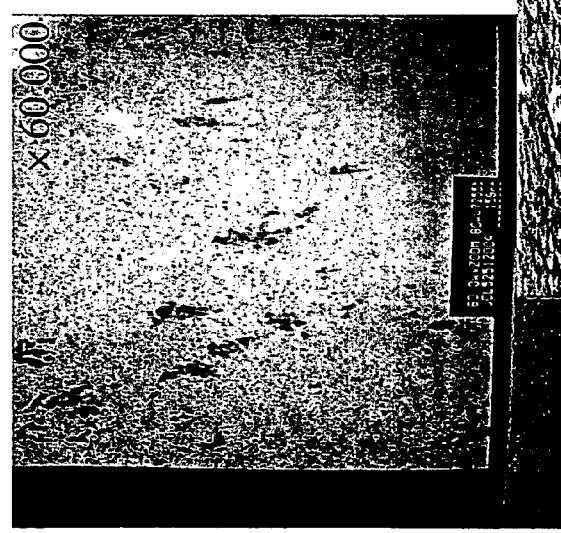
Fig. 11
Fig. 10

STRUCTURES OF THE PROTON EXCHANGE MEMBRANES WITH DIFFERENT MOLECULAR PERMEABILITIES

This Nonprovisional application claims priority under 35 U.S.C. §119(a) on patent application Ser. No(s). 093103839 filed in TAIWAN, R.O.C. on Feb. 18, 2004, the entire contents of which are hereby incorporated by reference.

FIELD OF THE INVENTION

The invention relates to a low permeable methanol-fueled proton exchange membrane, especially to the proton exchange membrane with the reverse permeability of water molecules in the proton exchange membrane greater than the permeability of methanol molecules and suitable for the application of the separation membrane in Direct Methanol Fuel Cell (DMFC) and the use of recovering water product on the cathode.

BACKGROUND OF THE INVENTION

The principle of the power generation by fuel cells was found by the experiment which done by British judge, William Grove in 1839. A fuel cell is an electrochemical energy conversion device that converts hydrogen and oxygen into water, producing electricity and heat in the process. Unlike the ordinary non-rechargeable battery which are disposed after use, It can be recharged in order to retain its electrical power by adding fuels (e.g. hydrogen or methanol) continuously.

The current fuel cells can be classified by the type of electrolyte they use: alkaline fuel cells (AFC), phosphoric acid fuel cells(PAFC), molten carbonate fuel cells(MCFC), solid oxide fuel cells(SOFC) and proton exchange membrane fuel cells(PEMFC). Typical prior arts such as U.S. Pat. No. 5,272,017 with a title of "Membrane-electrode assemblies for electrochemical cells", U.S. Pat. No. 5,316,871 with a title of "Method of making membrane-electrode assemblies for electrochemical cells and assemblies made thereby", etc. Fuel cells can also be classified by the type of fuels they use, such as hydrogen-oxygen fuel cells, direct methanol fuel cells, hydrazine fuel cells, and zinc air fuel cells etc.

For example, direct methanol fuel cells (DFMC) use methanol aqueous solution as the fuel. When providing current, methanol is electrochemically oxidized at the anode electrocatalyst to produce electrons which travel through the external circuit to the cathode electrocatalyst where they are consumed together with oxygen in a reduction reaction and can recombine with the hydrogen ions and oxygen to generate by-product water. The proton exchange membranes mainly utilize polymeric electrolyte conducting ions. In the current literature, the common polymeric electrolytes were mainly fluoric polymeric structural grafting sulfonates, wherein the most widely used membrane in the current fuel cell systems are Nafion membranes (its structure shown in FIG. 1 and the micro-structure shown in FIG. 10).

The most difficult problem in the use of PEM in DMFC is that methanol and water are highly compatible molecules and can easily form complexes with protons. Protons are ions containing no electrons. As naked protons, protons have strong interactions with their environment to form complexes due to the absence of shielding of nuclear charges. If PEM needs to have higher proton conductivity, its chemical structure usually generate a strong hydrophilic environment and the hydrophilic environment made quite easy for methanol to be "hydrated". Therefore, methanol fuels used in DMFC are easily brought through PEM by combining with protons on the anode of the cell and it results in the losses of fuels on the anode. At the same time, the catalysts and oxygen on the cathode are consumed and the catalysts on the cathode are poisoned, which reduce the activities of the electrodes. This phenomenon is called "methanol crossover". This is one of the main causes that result in the poor efficiency of DMFC. The concentration of methanol fuels cannot be raised that also results in the decrease of the entire volume energy density of DMFC. Therefore in the research field of DMFC, the solution for the problem of over-permeable methanol in methanol fuels for PEM materials is the most critical technical bottleneck. The current solutions related to the permeability of methanol in materials are following:

1. To reduce the concentration of ion conducting groups (Ion Exchange Capacity, IEC) of PEM materials or to select other substitute materials for PEM (in stead of Nafion). The IEC value in PEM is the key to determine the proton conductibility of PEM. Higher IEC value will easily generate hydrophilic clusters in its structures, which reversely results in higher permeation of methanol. Therefore, some known technologies and researches utilize PEM with different IEC values to make the laminated structures or subject benzene-ring containing polymers to sulfonation in order to control the concentrations of ions in the system and to reduce the permeation of methanol. However, these technologies are mostly to be operated under high temperature for better proton conductivities, and most of the modification methods to theses membranes will result in the decrease of proton conductivities when reduced permeability of methanol. In addition, there are some literatures which use the conventional concepts of composite materials and blend electrolytes with other fiber or porous plastic material to reduce the swelling of the electrolytes by enforcing the materials. However, this also reduces the proton conductivities at the same time. The related prior arts are listed in Table 1.

TABLE 1

| Prior arts | Technical strategies and functions |
|---|---|
| U.S. Pat. No. 5,525,436 | Acid doped-PBI' using the hetero-ring of |
| U.S. Pat. No. 5,716,727 | imidazole to provide proton conductibility |
| U.S. Pat. No. 6,025,085 | However, it is more suitable for high temper- |
| U.S. Pat. No. 6,099,988 | ature and no-water environment condition. |
| U.S. Pat. No. 6,124,060 | |
| U.S. Pat. No. 5,599,639 | |
| U.S. Pat. No. 6,365,294 | Use of polyphosphazene substrate as PEM |
| U.S. Pat. No. 6,444,343 | PSSA + PVDF cross-linked membrane to obtain low crossover PEM. |
| U.S. Pat. No. 4,626,553 | Laminated two different IEC values PEM with same main chains of polymeric |
| U.S. Pat. No. 5,447,636 | Nafion + HDPE' PTFE laminate to enhance |
| U.S. Pat. No. 5,795,668 | the selectivity and to increase the mechanical properties of membranes |
| U.S. Pat. No. 6,242,122 | Laminated film' one of the layers as Pd membrane |
| U.S. Pat. No. 5,981,097 | Two or more layers of laminated film with |
| U.S. Pat. No. 4,672,438 | different ion exchange capacities |
| U.S. Pat. No. 5,654,109 | laminated film with different IEC values |

2. To change the proton conducting mechanism of PEM materials. It is expected to change from the vehicle mechanism of protons in PEM to the proton hopping mechanism for conducting by using inorganic solid acid materials. Organic materials hardly have proton hopping characteristic whereas inorganic materials always have its innate limitation in film-forming process. Moreover, there are only limited inorganic materials with high proton conductibility at room temperature and most of them are soluble in water.

Therefore, prior arts in this field have limited breakthrough and development. Known related patented technologies are listed Table 2.

TABLE 2

| Prior arts | Technical strategies and functions |
| --- | --- |
| U.S. Pat. No. 4,594,297 | PVA + heteropoly acid, apply in gas phase fuel feed |
| U.S. Pat. No. 4,380,575 | heteropoly acid solid electrolyte' apply in gas phase fuel feed |
| WO 9852243 | Completely apply zeolite as the electrolyte |

3. Organic/inorganic blended materials—to reduce the hydrophilic cluster volume of conventional PEM materials. In the early researches of PEM, in order to increase the water saturation of PEM used at high temperature or to reduce the crossover phenomenon of hydrogen/oxygen gases, some of prior arts use simple synthetic reactions to fill inorganic metal oxides into the cluster of PEM materials or to blend them directly with PEM materials. According to this approach, it expects to enhance the proton conductibility of PEM at high temperature and to reduce the permeation of fuels, for example, to reduce the permeation of methanol in DMFC. However, most of the experimental results are found that this hardly have significant improvements. The reason is that the proton conductibility decreases due to the reduction of the conductive pathways with the decreases of cluster volume in PEM materials while the permeability of certain methanol in PEM is reduced by using inorganic materials. These known patented technologies are listed Table 3 below.

TABLE 3

| Prior arts | Technical strategies and functions |
| --- | --- |
| U.S. Pat. No. 4,687,715 | PTFE + ZrOP porous membranes added into conductors |
| U.S. Pat. No. 5,849,428 | New method of depositing ZrOP in PEM |
| U.S. Pat. No. 5,919,583 | PEM + inorganic proton conductors used in DMFC result in low fuel crossover and high conductivity |
| U.S. Pat. No. 6,059,943 | PEM + ZrOP used in high temperature and enhancing the conductivity, SOL-GEL method |
| U.S. Pat. No. 6,387,230 | |
| U.S. Pat. No. 5,795,496 | s-PEEK, s-PES + zeolite, by using sulfonation of high performance engineering plastics to make the polymer membrane with proton conductivity. Additionally adding zeolite to reduce crossover |
| U.S. Pat. No. 6,447,943 | PEM + Porous + Acid, by using porous materials to create spaces for filling in liquid or solid acids to reduce crossover |

In addition, from the operation of DMFC perspective, it should recover the by-product water of the cathodic reaction from the system if needed to efficiently enhance the energy density of the materials in the future since the theoretical reaction concentration ratio of methanol to water is 1:1 molar ratio. The water could be mixed with high concentration of fuels on the anode to increase the energy density of fuels. The water management of fuel cells in the previous hydrogen-oxygen system is the focus of researches since the hydrogen-oxygen system fuel cells are operated at the temperature higher than 100° C. Therefore water in PEM materials is quite easily evaporated to dryness due to high temperature. Consequently, the system utilizes the water recovered from the cathode to increase the wetness, such as shown in U.S. Pat. No. 4,769,297. In DMFC systems, current DMFC systems focus on the application of the portable products. The key of main technologies is how to effectively enhance the fuel converting efficiency of the materials (the amount of power density and fuel utilization rate). Currently the important issues of DMFC to be operated at room temperature can be classified as following: 1. the permeability of methanol fuels is too high which results in low fuel utilization rate and can not increase the volume energy density of the system. 2. the recovery of the water by-product on the cathode. If the water formed by the reaction on the cathode could not be removed smoothly, it would block catalysts of the cathode which results in insufficient oxygen concentrations and decreased utilization rate of catalysts. Therefore, a good design of water and heating management mechanism is essential to ensure the fuel cells have a high performance and high energy efficiency. Due to the use of additional recovery apparatus such as pumps for the hydrogen-oxygen system in the past, its design is a technology to install a water-collecting apparatus on the cathode and to flow back the water collected by pumps for the use of the anode, for example in U.S. Pat. Nos. 4,037,024, 4,826, 741, 6,117,577, 6,432,568 and 6,579,637. Alternatively, it can utilize the pressure controls of the two ends in the feed materials to recover water of the cathode, for example in U.S. Pat. Nos. 5,503,944, 5,700,595, 5,853,909 and 6,586,128. As above, if it applied to miniaturized DMFC systems, the volume and complexity of cell systems are increased and it needs extra electric power to drive the pump. The current technology for resolving water management problems in DMFC systems is mainly adding more hydrophobic materials (such as PTFE) on the electrodes to repel water back to the anode. Nevertheless the effect of this approach is limited and the electrolytes and membranes can easily delaminate after the long use of the cells. The related approaches are in U.S. Pat. Nos. 6,277,513, 6,458,479, 6,492,052, 6,509,112 and 6,596, 422.

SUMMARY OF THE INVENTION

The invention is mainly to recover the water of the cathode into the anode through the design of membrane structure by the differences of concentrations between methanol (fuel) and water (by-product) on both the anode and cathode of fuel cells. The water recovered can be re-used as the fuel of the anode, which enhances the volume energy density of the entire cell. At the same time, it can reduce the fuel permeation of methanol molecules on the anode to prevent the decrease of cell efficiency. In order to achieve this goal, the proton exchange membrane substrates of the invention need to have different molecular permeability, the water reverse permeability in the proton exchange membrane materials has to be greater than the methanol permeability. At the same time, the methanol permeability has to be lower than the one of current materials to prevent from resulting in greater losses of anode fuels while recovering water on the cathode. The materials should have the characteristics of high proton conductivity and low methanol permeability.

This invention has to resolve two problems at the same time. One is to lower the permeability of methanol fuels (from the anode to the cathode) and the other is to recover the extra water from the cathode (from the cathode to the anode), therefore the permeability ratio of water to methanol should be greater than 1 (i.e. water permeability/methanol permeability >1). For example of Nafion (seen as the test result in FIG. 7), the methanol permeability is greater than the one of the invention although the reverse permeability of water is greater than the one of the invention. It represents that the fuel of the anode has greater losses to the cathode. Hence, it is not suitable for the concept of the invention.

The main structure of the proton exchange membrane proposed by the invention includes a kind of crystalline organic polymer substrate phase and a nano-scale ionic cluster structure uniformly dispersed in the organic polymer substrate phase. In the prior arts, the proton conductive membrane materials mostly were phase separated structures between hydrophilic and hydrophobic phases and ions of PEM would form larger ionic clusters during the formation of membranes. In a highly concentrated methanol solution, phase separated structures of hydrophilic and hydrophobic phases would be destroyed due to the substantial swelling cause by the increase of the concentration and the ionic clusters which resulted in the permeation of the methanol fuel. The invention changes the phase separated structures of hydrophilic/hydrophobic phases in the conventional PEM membranes to become the design in the phase separated structures of crystalline and amorphous phases to reduce the swelling of materials in fuels for achieving the requirement of low methanol permeation. In addition, it increases the ion exchange capacity by polymer grafting reactions. By controlling the concentrations of reaction materials, it prevents forming bulky ion aggregate clusters. The ion aggregates are uniformly distributed on the surface of the materials, so the materials would present a greater water uptake but lower methanol permeation in the performance of the materials. The water molecules in the proton exchange membranes can have higher reverse permeable rate than in Nafion. Therefore the permeable rate of water is higher than the one of methanol molecules in order to achieve the function of recovering water on the cathode.

Generally, if the ion exchange capacity increases in PEM materials, it results in the increase of swelling of the materials at the same time. Therefore the permeability of methanol enhances while its performance drops off. But in the invention, the crystalline structure of the materials inhibits material swelling in methanol and ion clusters of the materials are limited in nano-scale space due to the control of crystalline polymers, which achieves the characteristics of low methanol permeability and high water permeability at the same time.

The preferred embodiments and detailed descriptions of the technology related to the invention will be demonstrated as followed by reference to the descriptions of the Figures.

BRIEF DESCRIPTION OF THE DRAWINGS

FIG. 7 shows that the results of the permeabilities, the ratios of water molecules to methanol molecules and the loss ratios of methanol fuels tested in different concentrations of aqueous methanol solutions.

FIG. 10 is the image of micro-structure for Nafion-117 membrane.

FIG. 11 is the image of micro-structure for the proton exchange membrane (PEM-A) of the invention.

DETAILED DESCRIPTION OF THE PREFERRED EMBODIMENTS

Figure 2:
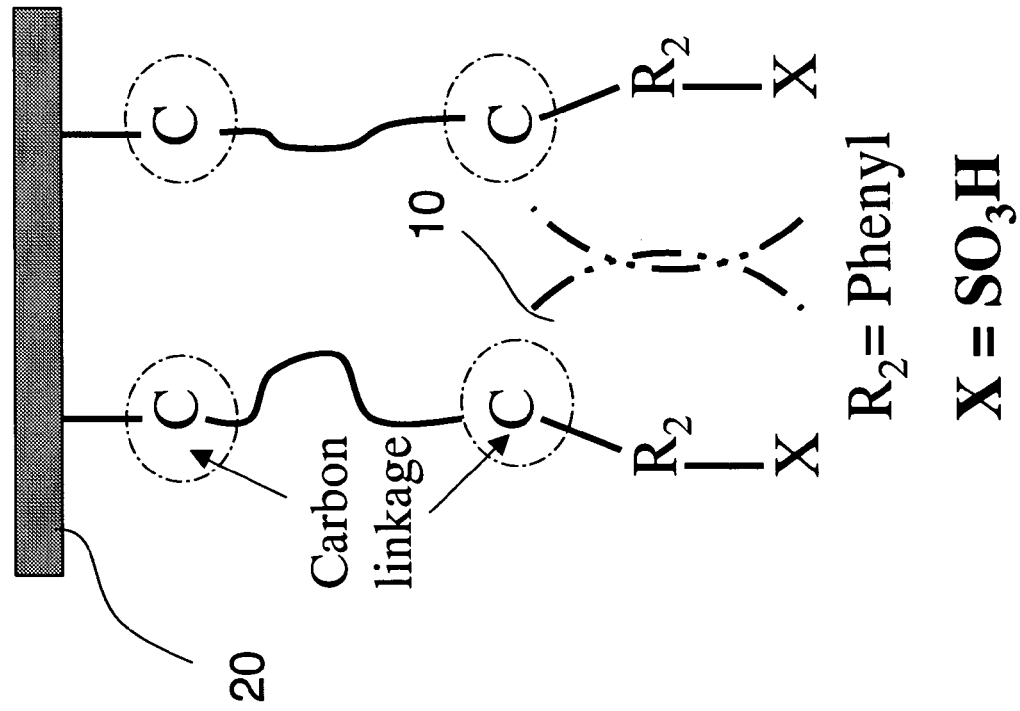
FIG. 2 is the structural diagram of the proton exchange membrane of the invention.
Figure 1:
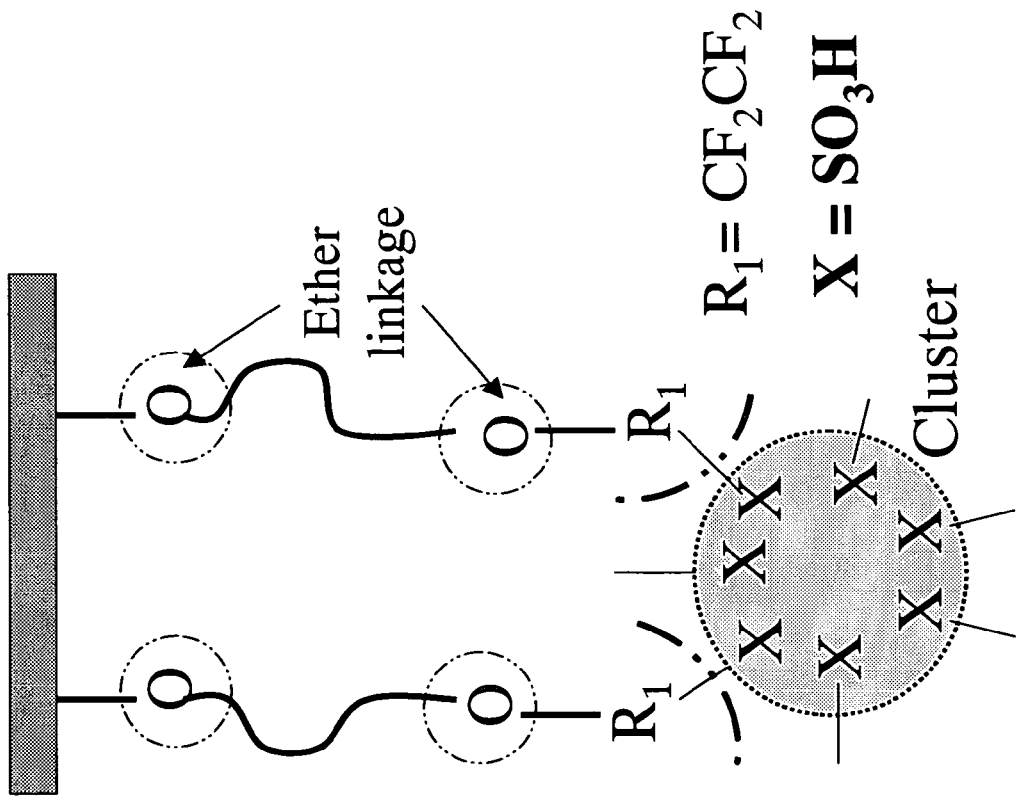
FIG. 1 is the structural diagram of Nafion membrane.

Please refer to FIG. 2, it is a structural diagram of proton exchange membrane of the invention. The key point of the invention is to change the hydrophilic and hydrophobic phases in Nafion into crystalline and amorphous phases for achieving low methanol permeation. From FIG. 2, it is obvious that the difference in the Nafion structure between the conventional and the invention is the functional group 10 (for example, sulfonated benzene ring structure in the Figure) attached to substrate 20 via carbon linkage.

The production process of the proton exchange membrane includes the following steps:

1. A step to prepare an organic polymer substrate containing polystyrene (PS) and polyvinylidene fluoride (PVDF) resin mixtures;

2. A step to produce a polyvinylidene fluoride grafted polystyrene resin (PVDF-g-PS) by conducting a grafting reaction of the above mixture;

3. A step to generate an organic polymer membrane (PVDF-g-PS membrane); and

4. A step to form a polyvinylidene fluoride grafted sulfonated polystyrene resin (PVDF-g-SPS) by ionizing the above PVDF-g-PS membrane for obtaining cationic exchange groups.

The organic polymer membrane substrate in the proton exchange membrane of the invention could be added with fluorine-containing resins to form a composite membrane. The suitable fluorine-containing resins include polyvinylidene fluoride, polyvinylidene fluoride/hexafluoropropylene copolymer, polyvinylidene fluoride/chlorotrifluoroethylene copolymer, polyvinylidene fluoride/hexafluoropropylene/tetrafluoroethylene tri-polymer or polychlorotrifluoroethylene. In addition to fluorine-containing resins, non-fluoro resins could be also added into the organic polymer membrane substrates to form composite membranes. The suitable non-fluoro resins include polyacrylate, polyester, polyetheretherketone, polysulfone (PSF), polyether, polyamide, polyphenylene oxide or polyethylene oxide.

In the above embodiments, the sulfonation reaction undergoes with chlorosulfonic acid to obtain cationic exchange groups. Other materials used for obtaining cationic exchange groups include sulfonate, carboxylate, phosphonate, imide, sulfonamide or sulfonamide.

In the design of the polymeric structures, the invention regulates the values of ion exchange capacity after the subsequent sulfonation step by the control of polymer grafting reaction to adjust the proton conductivity of the materials. The following embodiments would demonstrate the preparative methods of proton exchange membranes with different ion exchange capacities and the related character are shown in Table 4.

TABLE 4

|  | Nafion | PEM-A | PEM-B | PEM-C |
| --- | --- | --- | --- | --- |
| IEC (meq/g) | 0.84 | 1.28 | 0.82 | 1.34 |
| Conductivity (S/cm) | $5.3 * 10^{-2}$ | $1.3 * 10^{-1}$ | $4.8 * 10^{-2}$ | $1.0 * 10^{-2}$ |
| Permeability (cm²/sec) | $4.1 * 10^{-6}$ | $8.3 * 10^{-7}$ | $6.9 * 10^{-7}$ | $1.1 * 10^{-6}$ |
| Conductivity/Permeability | $1.3 * 10^{4}$ | $1.6 * 10^{5}$ | $7.0 * 10^{4}$ | $9.4 * 10^{3}$ |
| Water Uptake (wt %) | 23.7 | 64.1 | 20.0 | 65.9 |
| MeOH Uptake (wt %) (@50 vol % MeOH) | 70.3 | 57.4 | 18.7 | 70.5 |

From the results of Table 1, it is found that the ion exchange capacity of the proton exchange membrane of the invention is at least greater than 0.8 mmolH$^+$/g (between 0.8 and 2.0 mmolH$^+$/g) and even up to 1.34 mmolH$^+$/g. The proton conductibility of the materials is much better than the one of Nafion (greater than $1*10^{-2}$ S/cm), and the methanol permeability is much lower (smaller than $1*10^{-6}$ cm$^2$/sec). Compared to Nafion membrane, it generate superior effects.

Embodiment 1

1. 40 grams of styrene monomer (purity 99.9%) is added to 40 grams of polyvinylidene fluoride resins. Uniform stirring gives a mixture (PVDF-g-PS). Then the grafting reaction is performed by Co-60 irradiation with the control of the radiation dosage at 25 kGy.

2. The crude products of polyvinylidene fluoride grafted polystyrene resin (PVDF-g-PS) are treated with ethyl acetate for Soxhlet extraction to remove the un-reacted monomers and styrene homo-polymers. The products are dried under ambient temperature or by heating to obtain white PVDF-g-PS products. The grafting percentage is 62.5 wt %.

3. Add 6.9 g of PVDF-g-PS and 10 mg of fluorosurfactant FC-430 and dissolve in 70 ml of 1-Methyl-2-pyrrolidone. Then the membrane is formed under 120° C.

4. Then the membrane undergoes the sulfonation reaction at 25° C. with chlorosulfonic acid for 8 hours of reaction time. The membrane after sulfonation is washed with tetrahydrofuran and water, then dried at 80° C. under vacuum for 6 hours to obtain polyvinylidene fluoride grafted sulfonated polystyrene resin (PVDF-g-SPS) proton exchange membrane (its characters are seen as marked as PEM-A in Table 4). Its microstructure is shown in FIG. 11.

Embodiment 2

1. 40 grams of styrene monomer (purity 99.9%) is added to 40 grams of polyvinylidene fluoride resins. Uniform stirring gives a mixture (PVDF-g-PS). Then the grafting reaction is performed by Co-60 irradiation with the control of the radiation dosage at 25 kGy.

2. The crude products are treated with ethyl acetate for Soxhlet extraction to remove the un-reacted monomers and styrene homo-polymers. The products are dried under ambient temperature or by heating to obtain white PVDF-g-PS products. The grafting percentage is 62.5 wt %.

3. Add 9 g of PVDF-g-PS, 12.5 g of polyvinylidene fluoride resin and 30 mg of fluorosurfactant FC-430 and dissolve in 210 ml of 1-Methyl-2-pyrrolidone. Then the membrane is formed under 120° C.

4. Then the membrane undergoes the sulfonation reaction at 25° C. with chlorosulfonic acid for 8 hours of reaction time. The membrane after sulfonation is washed with tetrahydrofuran and water, then dried at 80° C. under vacuum for 6 hours to obtain polyvinylidene fluoride grafted sulfonated polystyrene resin (PVDF-g-SPS) proton exchange membrane (its characters are seen as marked as PEM-B in Table 4).

Embodiment 3

1. 50 grams of styrene monomer (purity 99.9%) is added to 40 grams of polyvinylidene fluoride resins. Uniform stirring gives a mixture (PVDF-g-PS). Then the grafting reaction is performed by Co-60 irradiation with the control of the radiation dosage at 25 kGy.

2. The crude products of PVDF-g-PS are treated with ethyl acetate for Soxhlet extraction to remove the un-reacted monomers and styrene homo-polymers. The products are dried under ambient temperature or by heating to obtain white PVDF-g-PS products.

The grafting percentage is 71 wt %.

3. Add 5 g of PVDF-g-PS, 10 g of polyvinylidene fluoride resin, 0.5 g acrylate elastomer, 0.2 g of dioctylphthalate and 20 mg of fluorosurfactant FC-430 and dissolve in 160 ml of 1-Methyl-2-pyrrolidone. Then the membrane is formed under 120° C.

4. Then the membrane undergoes the sulfonation reaction at 25° C. with chlorosulfonic acid for 8 hours of reaction time. The membrane after sulfonation is washed with tetrahydrofuran and water, then dried at 80° C. under vacuum for 6 hours to obtain a laminated proton exchange membrane (its characters are seen as marked as PEM-C in Table 4).

Figure 3:
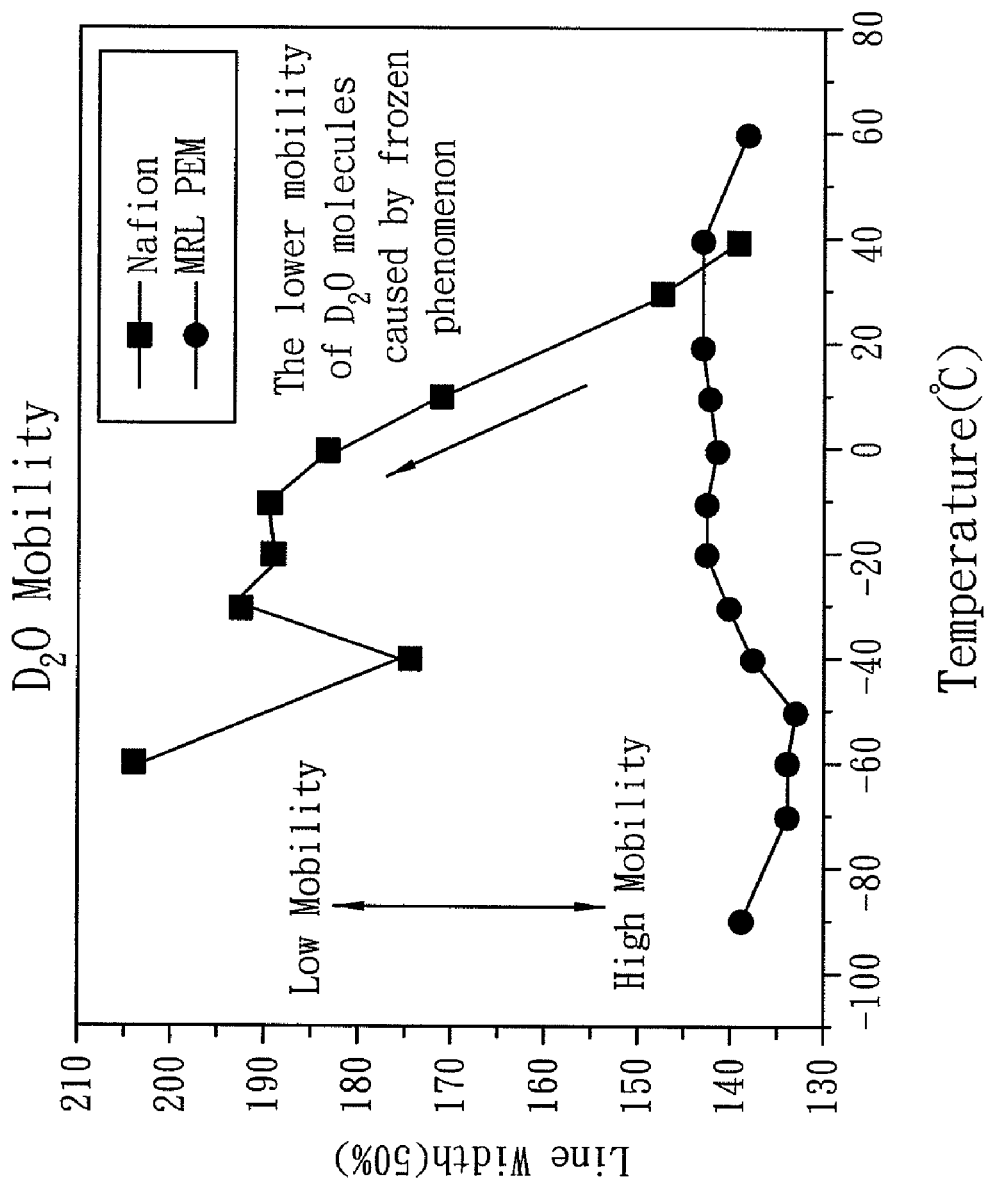
FIG. 3 is the NMR spectra of the mobility of water molecules.
Figure 4:
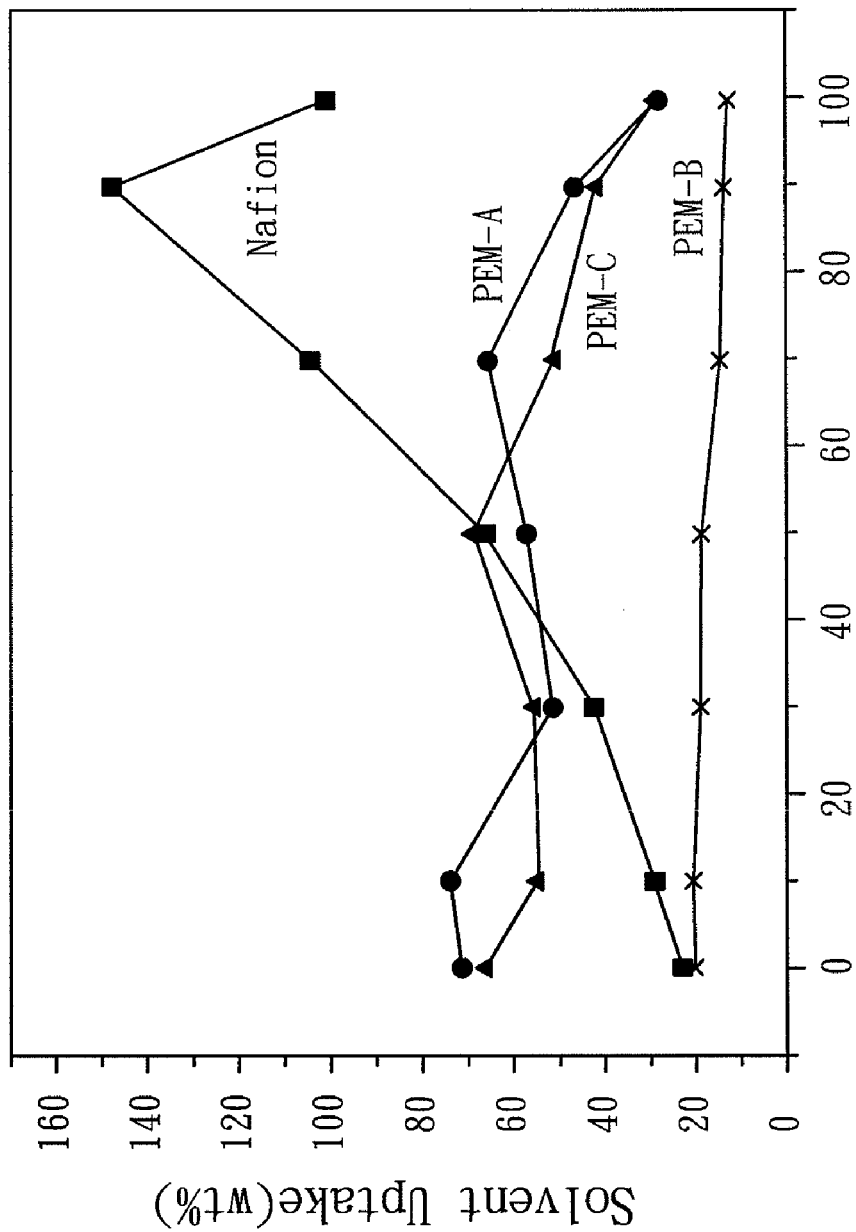
FIG. 4 is the diagram of the swelling test.
Figure 5:
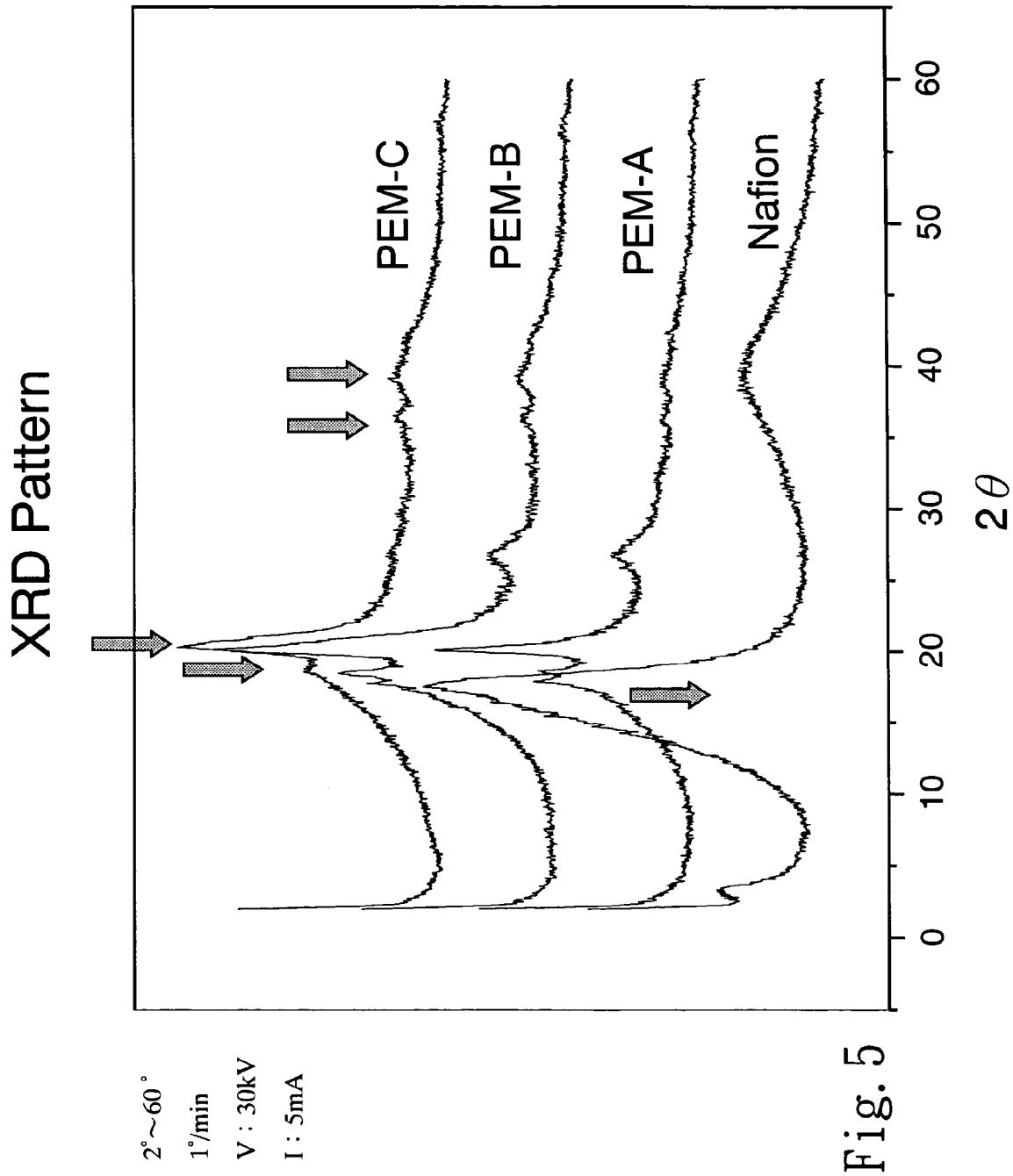
FIG. 5 is the XRD patterns of the crystallinity.
Figure 6:
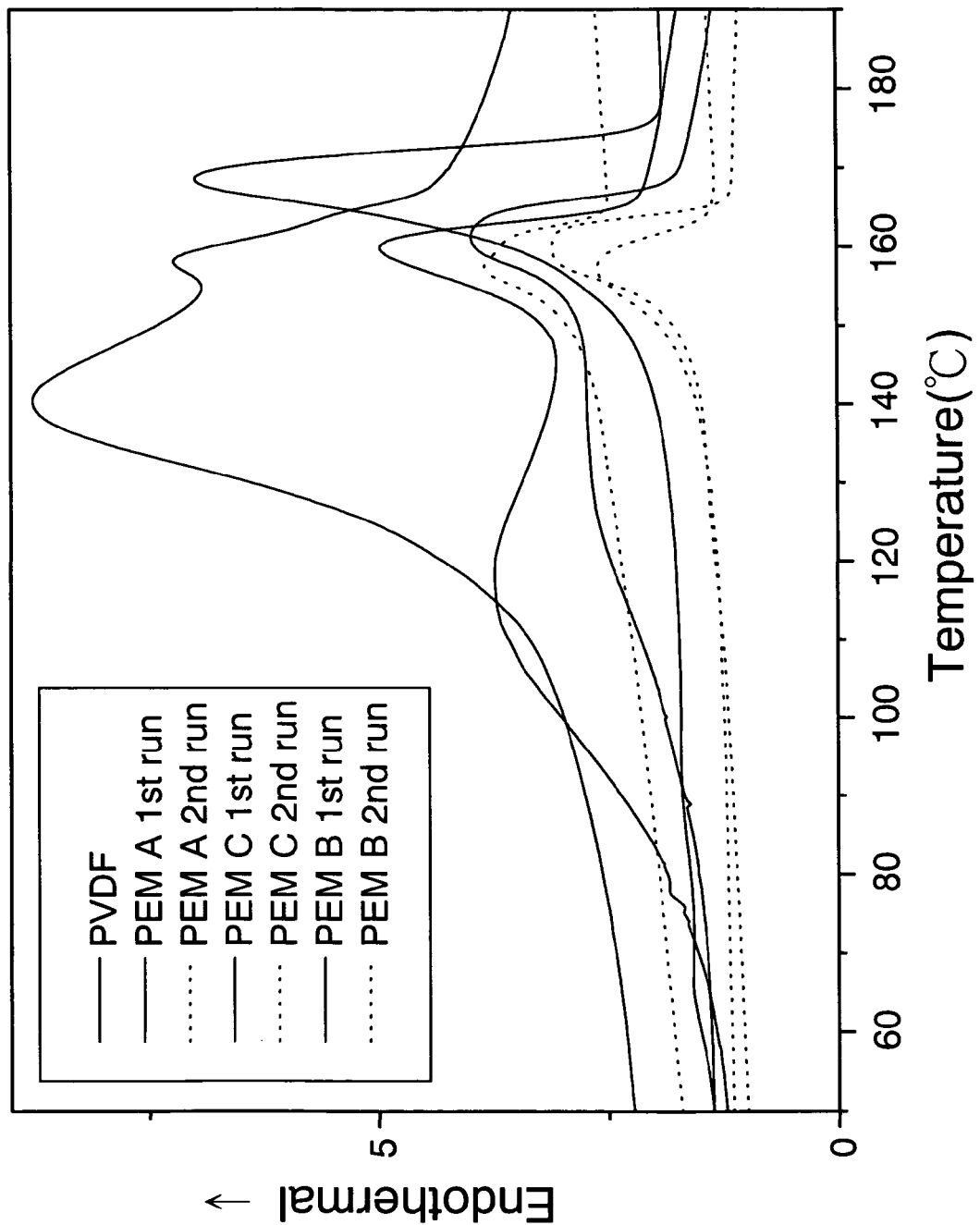
FIG. 6 is the DSC patterns of the crystallinity.

By controlling the polymer grafting reaction, the invention increases the numbers of IEC values, but the space of ionic cluster structures of PEM is limited to the tiny nano-scale. At this point, NMR method were applied for identifying the mobility characters of water molecules since electronic microscope can not observe the space of the ionic clusters (the space of ionic cluster is average 0.4 nm-2 nm.). Referring to FIG. 3, it demonstrates the mobility spectra of water molecules by the variable temperature nuclear magnetic resonance (NMR). Its process is that the proton exchange membrane is saturated with water and undergoes the variable temperature. Compared with the proton exchange membrane prepared by the invention (marked as MRL PEM) to Nafion membrane, it finds from the results of experiments that the mobility of water molecules in Nafion membrane decrease quickly (water molecules frozen) while the ambient temperature decreases. However, the mobility of water molecules in the proton exchange membranes prepared according to the technology of the invention does not have significant changes. Therefore it demonstrates that the space of ionic clusters in PEM disclosed in the invention is tiny (less than 1 nm) and causes the water molecules not easy to generate icy crystal particles. Subsequently the methanol molecules are not easy to permeate MRL PEM. Other related characters of the proton exchange membrane disclosed by the invention can be observed through several different tests as following:

As the swelling test in FIG. 4, the proton exchange membranes (PEM-A, PEM-B, PEM-C) prepared from three embodiments above are compared with Nafion membrane. While the concentration of methanol (MeOH) is increased, the swelling of Nafion by methanol becomes obvious (the uptake weight percentage of methanol is increased). However, three proton exchange membranes of the invention do not have significant changes. The reason is due to the fact that the crystalline phase of the polymer substrate in the materials has the inhibitive action to the swelling of the materials wherein the crystalline organic polymer substrate being 50~90 wt % of the entire PEM weight percentages can achieve decent effects. FIGS. 5 and 6 are the results of crystallinity identification (identified by XRD and DSC) for three proton exchange membranes (PEM-A, PEM-B, PEM-C) made from three embodiments above and Nafion membrane. In addition, exemplified with the proton exchange membranes PEM-A produced by the invention and Nafion-117 membrane, the permeabilities and the ratios of water molecules to methanol molecules with the loss ratios of methanol fuels are tested in different concentrations of aqueous methanol solutions (methanol concentration up to 100 vol. %). The results are shown in FIG. 7 and it finds that the proton exchange membrane PEM-A of the invention is superior to Nafion-117 and the water permeate at a faster rate than the methanol one (i.e. water permeability/methanol permeability >1).

Figure 8:
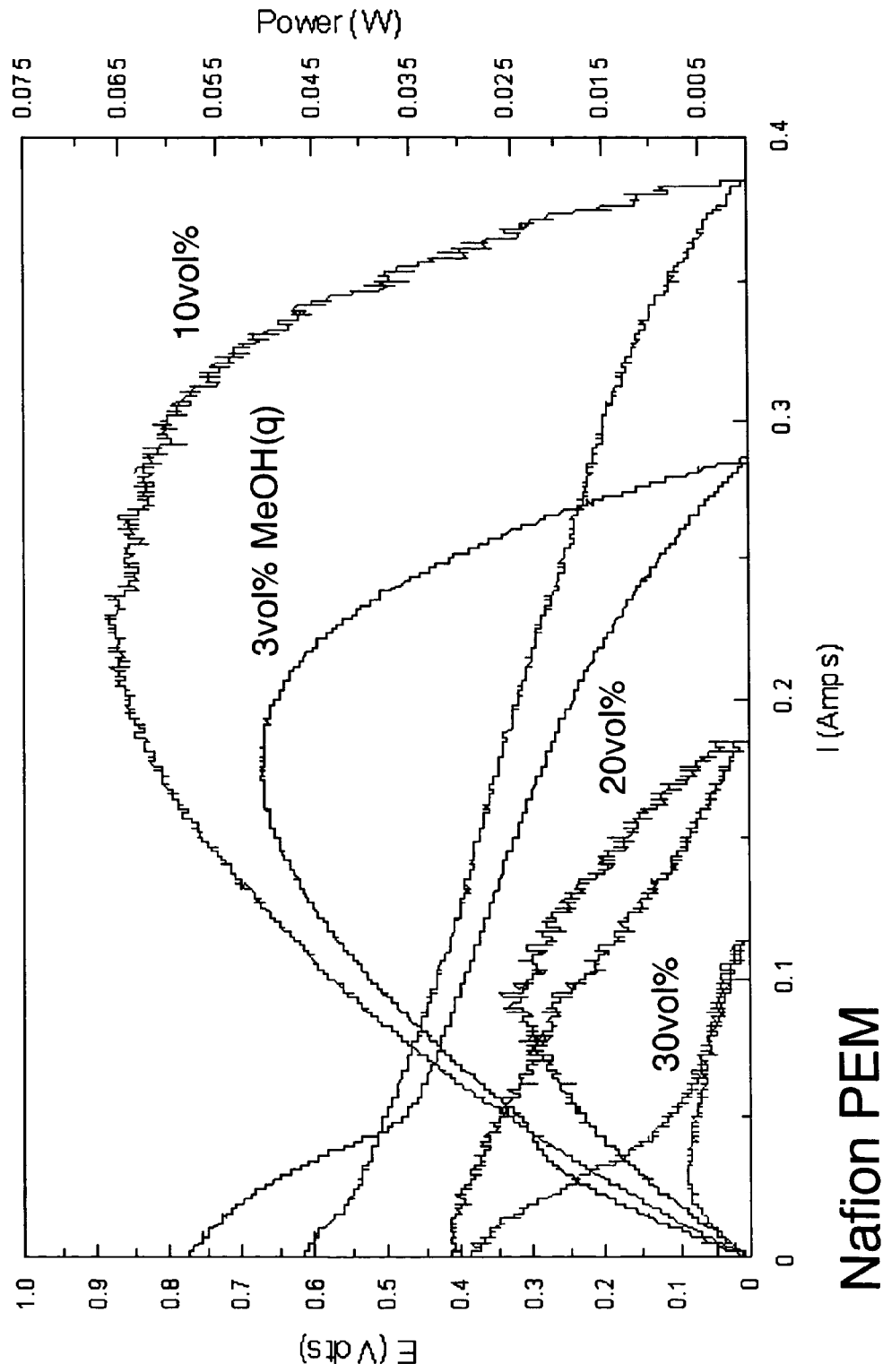
FIG. 8 is the test result of efficiency for a single cell of Nafion membrane in air breathing DMFC.
Figure 9:
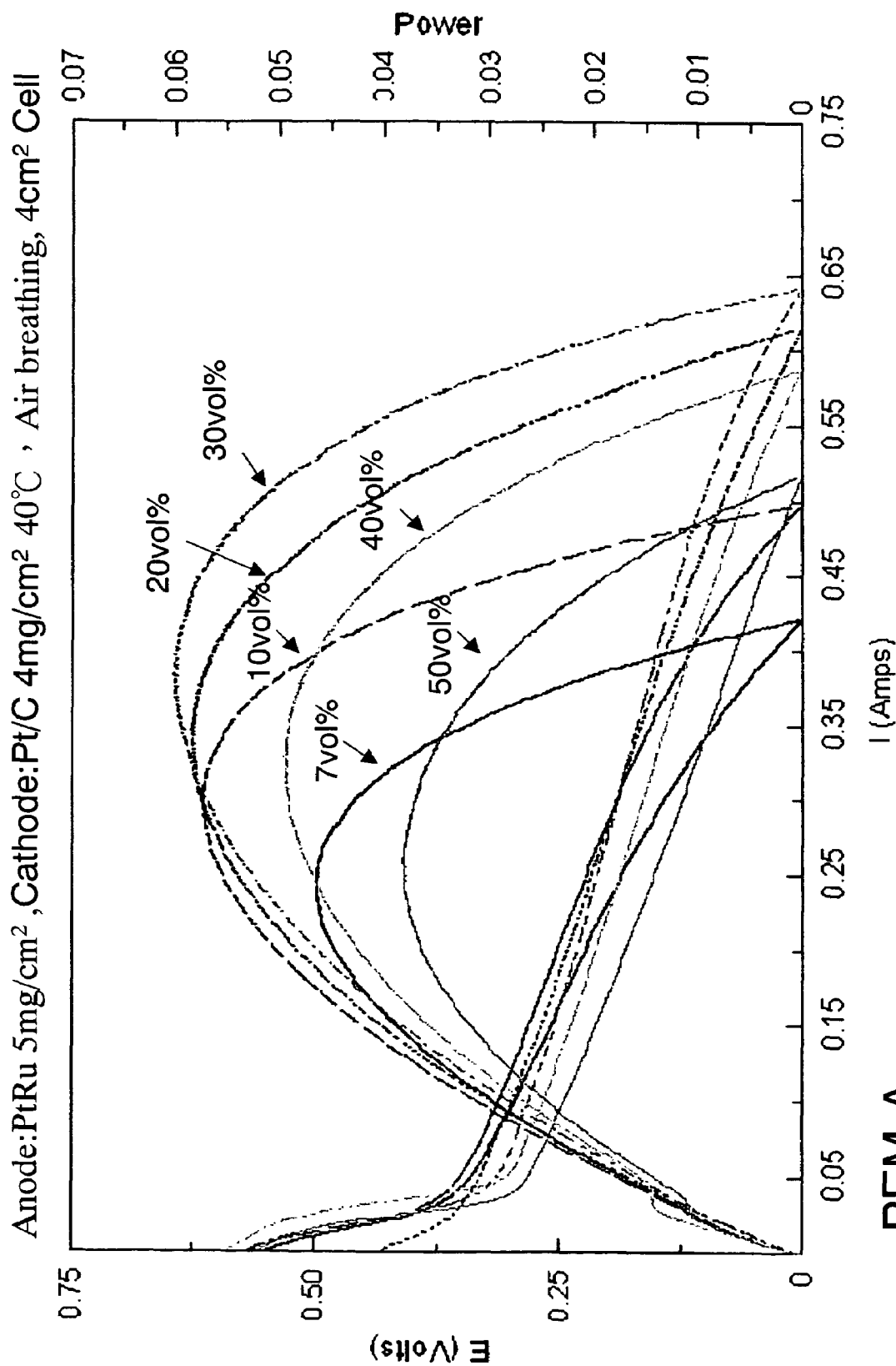
FIG. 9 is the test result of efficiency for a single cell of the proton exchange membrane (PEM-A) of the invention in air breathing DMFC.

In addition, each single cell of the proton exchange membranes(PEM-A) made according to the embodiment above and Nafion membrane of air breathing DMFC undergo the comparison of the efficiency shown in FIGS. 8 and 9. It finds from the results that Nafion system has a serious crossover phenomenon while methanol concentration is raised. But in MRL system, it can be operated until 50 vol % without significant decreases of the efficiency.

The proton exchange membrane and its preparation method disclosed according to the invention can fit the requirements of the proton conductivity and low methanol permeation, especially the reverse permeability of water molecules is greater than the permeability of methanol molecules. In the future, it can be applied to the function of recovering water by-products on the cathode. The cost of the polymer materials selected by the invention is inexpensive and it is easier to produce than the conventional fully fluorinated polymeric materials, which would be more economical.

The descriptions above are only the preferred embodiments of the invention and not for limiting the practice scopes of the invention. The equivalent changes and modifications made according to the contents of claims of the invention are all within the technical scope of the invention.

What is claimed is:

1. A structure of the proton exchange membranes with different molecular permeabilities, wherein its structure includes a polymer substrate phase and a nano-scale cationic exchange group aggregate uniformly distributed in the polymer substrate phase, with its physical characteristics in that the rate of reverse permeability of the water molecules on the cathode back to the anode in the proton exchange membrane structure is greater than the permeability of methanol molecules from the anode to the cathode, wherein the methanol permeability is less than $1*10^{-6}$ cm$^2$/sec and proton conductivity is larger than $1*10^{-2}$ S/cm in methanol solutions, wherein organic polymer membrane substrate is added with non-fluoro resin to form a composite membrane, and wherein the non-fluoro resin is any one of those selected from the group consisted of polyacrylate, polyester, polyetheretherketone, polysulfone (PSF), polyether, polyamide, polyphenylene oxide and polyethylene oxide.

2. The structure of the proton exchange membranes with different molecular permeabilities as claimed in claim 1, wherein the polymer substrate phase is a crystalline organic polymer substrate.

3. The structure of the proton exchange membranes with different molecular permeabilities as claimed in claim 2, wherein the crystalline organic polymer substrate is 50~90wt % of the proton exchange membrane weight percentages.

4. The structure of the proton exchange membranes with different molecular permeabilities as claimed in claim 1, wherein the Ion Exchange Capacity is 0.82.~2.0 mmolH$^+$/g.

5. The structure of the proton exchange membranes with different molecular permeabilities as claimed in claim 1, wherein the cationic exchange group is any one of those selected from the group consisted of sulfonate, carboxylate, phosphonate, imide, sulfonamide and sulfonamide.

6. The structure of the proton exchange membranes with different molecular permeabilities as claimed in claim 1, wherein the structure is a polyvinylidene fluoride grafted sulfonated polystyrene resin (PVDF-g-SPS).

7. The structure of the proton exchange membranes with different molecular permeabilities as claimed in claim 2, wherein the organic polymer membrane substrate is added with fluorine-containing resins to form a composite membrane.

8. The structure of the proton exchange membranes with different molecular permeabilities as claimed in claim 7, wherein the fluorine-containing resin is any one of those selected from the group consisted of polyvinylidene fluoride, polyvinylidene fluoride/hexafluoropropylene copolymer, polyvinylidene fluoride/ chlorotrifluoroethylene copolymer, polyvinylidene fluoride/hexafluoropropylene/tetrafluoroethyene tri-polymer or polychlorotrifluoroethylene.

9. The structure of the proton exchange membranes with different molecular permeabilities as claimed in claim 1, wherein the methanol concentration is 30~100 vol. %.

10. The structure of the proton exchange membranes with different molecular permeabilities as claimed in claim 1, wherein the ratio of the reverse permeability of water to the methanol permeability is greater than 1.

11. The structure of the proton exchange membranes with different molecular permeabilities as claimed in claim 10, wherein the methanol concentration is 30~100vol. %.

* * * * *